(12) United States Patent
Jones

(10) Patent No.: US 8,724,134 B2
(45) Date of Patent: May 13, 2014

(54) SYSTEMS AND METHODS FOR IMPLEMENTING RECENT EXPERIENCE COMMENT AND RECENT ACTIVITY LOG FEEDBACK IN IMAGE FORMING AND MEDIA HANDLING DEVICES

(75) Inventor: Brent Rodney Jones, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 137 days.

(21) Appl. No.: 13/361,892

(22) Filed: Jan. 30, 2012

(65) Prior Publication Data
US 2013/0194607 A1    Aug. 1, 2013

(51) Int. Cl.
*G06K 15/00* (2006.01)
*G06F 3/12* (2006.01)

(52) U.S. Cl.
USPC .......................................... 358/1.14; 358/1.15

(58) Field of Classification Search
USPC ............... 358/1.1, 1.9, 1.13, 1.14, 1.15, 1.18; 399/8, 9, 10
See application file for complete search history.

(56) References Cited

U.S. PATENT DOCUMENTS

| | | | |
|---|---|---|---|
| 6,366,741 B1 * | 4/2002 | Fukushima | 399/8 |
| 7,539,656 B2 * | 5/2009 | Fratkina et al. | 706/45 |
| 8,145,073 B2 * | 3/2012 | Bouchard et al. | 399/8 |
| 8,204,884 B2 * | 6/2012 | Freedman et al. | 707/737 |
| 2005/0028005 A1 * | 2/2005 | Carson et al. | 713/200 |

\* cited by examiner

*Primary Examiner* — Gabriel Garcia
(74) *Attorney, Agent, or Firm* — Ronald E. Prass, Jr.; Prass LLP

(57) ABSTRACT

A feedback scheme is provided in which a combination of function specific firmware and hardware are used to capture a greater representation of issues experienced by a group of end-users specific to particular product with which the combination of function specific firmware and hardware is associated. Product-resident hardware stores record of product usage, faults, interventions and maintenance associated with a particular time window so that product-generated data can be coupled with user-generated experience feedback. A digitally-recorded description of the issue with which the user was confronted that prompted the feedback, and pertinent time frame product operating data is combined and transmitted to a product monitoring center for compilation, analysis and review.

18 Claims, 5 Drawing Sheets

SYSTEMS AND METHODS FOR IMPLEMENTING RECENT EXPERIENCE COMMENT AND RECENT ACTIVITY LOG FEEDBACK IN IMAGE FORMING AND MEDIA HANDLING DEVICES

BACKGROUND

1. Field of Disclosed Subject Matter

This disclosure relates to systems and methods for facilitating more consistent feedback from end-users of image forming and media handling devices that is supplemented by recent activity log information for the image forming and media handling devices on which the end-users provide the feedback.

2. Related Art

Companies, including suppliers, manufacturers and service providers, make extensive beneficial use of customer or end-user feedback regarding their products and services in whatever form that feedback may be provided. Customer or end-user feedback can aid in addressing current concerns regarding the products and services, but can prove invaluable in, for example, setting the standards for development of the next generation of products by a particular manufacturer, or revising how services are delivered by a particular service provider. Customer or ended-user feedback then provides an important mechanism by which a manufacturer or service provider can interact with its customers and end-users to enhance current and future experiences for the customers and end-users with the provided products and services. In this manner, the manufacturer or service provider can improve an overall quality of service to the customer or end-user based on particular needs highlighted by the customers or end-users. All of this may have a pronounced effect on a customer's or end-user's willingness to continue to do business with a particular manufacturer or service provider.

In order to be most effective, a customer's or end-user's feedback regarding operation of, or interaction with, a particular product should be informed, complete and timely. Further, to the extent possible, the feedback should be provided in the context of the particular operation of, or interaction with, the product that may have occasioned the customer or end-user chose to provide the feedback. This operating context is often overlooked by the customer or end-user in providing feedback. Also, when it is provided, the operating context may be inaccurate or incomplete based on the customer or end-user failing to fully understand relevant details in the operation of the product or specific operating limitations relevant to the product.

Unfortunately, feedback from customers and end-users tends to be haphazard and inconsistent. Companies have attempted to address the inconsistent nature of customer or end-user feedback in a number of creative ways. Despite those efforts, however, the process of collecting usable, consistent feedback continues to suffer certain shortfalls. For example, when companies reach out to solicit specific feedback from, for example, high-frequency users, the users are often unreachable. The direct solicitation of specific feedback often comes at a time that is inconvenient for the user such as when the user's attention is directed elsewhere. Otherwise, the direct solicitation of specific feedback may come at a time that is well attenuated from any specific incident or event that may have prompted usable feedback, positive or negative. In these later cases, it is rare that a user is able to recount, on a spur of the moment and in sufficient detail, information regarding the operation of a particular system that may aid the company soliciting the feedback in ascertaining the precise nature of ongoing difficulties, and/or a user's desires and frustrations with regard to a particular system in question.

Customers may be surveyed or interviewed for the purpose of determining trends, requests, weaknesses or complaints regarding particular products or families of products. The individuals targeted by these surveys or interviews, however, may not have at their disposal current pertinent information by which to be able to provide specific relevant feedback. The individuals may be able to recount general impressions, but may otherwise simply not recall the details of a particular incident or operation of the products at a level of detail that may aid the company in taking appropriate corrective action with regard to currently-fielded products, and/or otherwise provide a basis for design changes to address the concerns or suggestions that may be raised as future products are developed and manufactured. By their nature, customer surveys and interviews may only provide the company conducting such surveys and interviews with a less than complete story regarding any particular issue that a customer or end-user may have. Experience with the product that is the subject of the survey or interview typically extends over months prior to any request for feedback being solicited, or otherwise any pertinent feedback being offered. Additionally, given the nature and timing of these surveys and interviews, any appropriate context regarding the operations of, or the operating limitations associated with, the products that may be relevant to any issue raised in a particular survey response or interview is lost. As a result, issues that are of concern to the product users, or needs and wants that could otherwise be addressed in the operation of the product, often go unarticulated when feedback is sought in the above manner. Also, despite a company's best efforts at soliciting feedback from an appropriate level of users, many individuals with valid or useful inputs are never reached.

In a networked computing environment, some companies have chosen to become more aggressive in their solicitation of feedback from day-to-day users of their systems and component products. These efforts often manifest themselves in attacks on users with pop-up boxes being presented on the display screen of a user's workstation when a particular action requested by the user via the workstation is recognized by the system as an action programmed to trigger a specific feedback request. Among the difficulties with these types of solicitations for feedback is that they all-too-often occur when there is no need for the user to provide any feedback. If the triggering action, for example, was performed in the manner expected, there may be no reason to prompt the user to provide any response. Further, this type of feedback solicitation may be viewed by users as an increasing nuisance when it appears on too many occasions. When such solicitation happens all too frequently, some users may tend to become, in a sense, anesthetized to the presence of these pop-up boxes and simply dismiss them out of habit resulting in a failure to employ the mechanism provided for its intended purpose when interaction with a particular product such as, for example, an image forming device or a media handling device with which the workstation communicates, may warrant providing the requested feedback. Finally, these automatically presented direct solicitations of feedback, even if they were to prompt a particular user to provide some response, suffer from the same shortfall in other methods in failing to provide any appropriate operating context for the product, as discussed briefly above, which may be particularly germane to the subject matter of the user feedback. Aspects of operations that may prompt user feedback relate to media handling as well as image forming operations. Media folds, tears, wrinkling, displacement during feed or transport and jams are common to a number of media handling and imaging devices. The term "image forming device" includes imaging devices and document and media handling devices.

SUMMARY OF THE DISCLOSED EMBODIMENTS

In view of the above shortfalls in acquiring complete, timely, consistent and accurate feedback regarding a particular product in use, and particularly an image forming device with which a user communicates to accomplish image forming and/or media handling functions, it would be advantageous to provide a system and method that, in a non-obtrusive manner, may simplify the feedback process for the user while providing usable context regarding an operation of the image forming device that may have prompted the user to generate feedback.

Exemplary embodiments may provide a unique combination of function specific firmware and hardware to capture a greater representation of issues experienced by a group of end-users specific to particular product with which the combination of function specific firmware and hardware is associated.

Exemplary embodiments may include product-resident hardware that stores, in a specific location of memory, for example, a record of product usage, faults, interventions and maintenance associated with a particular "current" time window so that product-generated current time window data can be coupled with user-generated "Experience Feedback." In this manner, a digitally-recorded description of the issue with which the user was confronted that prompted the feedback, and pertinent time frame product operating data, may be combined and transmitted to a specific product monitoring center for compilation, analysis and review.

Exemplary embodiments may provide a mechanism whereby Experience Feedback by a user as to problems, perceived weaknesses, function needs requests, positive operating features and interactions, and the like may be accumulated in a more real time manner. This may be accomplished by configuring, for example, a print driver presented to the user with a simple, unobtrusive means, at the user's workstation, for the user to interact with the print driver in a manner that facilitates the user generating feedback information on a real time basis. Accomplishing this function through a portal, such as a user's workstation, rather than on, for example, the graphical user interface (GUI) of the product itself may prevent tying up front panel access at the product and make the input means as convenient as typing a simple message or selecting appropriate check boxes. In facilitating a simple manner by which a user may format and forward feedback, an objective is not that every user will, in each instance, avail themselves of the opportunity to provide feedback. Rather, the systems and methods according to this disclosure may provide, in a visible yet non-obtrusive fashion, a simple means to provide feedback, which is more likely to be used on a more frequent basis, by a broader base of users and, for example, sooner in a new product's life in a manner that mediates the limitations of forgetfulness on the part of the user.

Exemplary embodiments may provide a mechanism whereby issues of concern to users that may arise in the context of newly-released products may be raised in a more timely manner resulting in a more timely gathering of product needs below, for example, a threshold of more serious problems.

Exemplary embodiments may provide users that typically are less likely to take the time to pass on experiences to the Information Technology staff, or other individuals responsible for purchasing, maintaining or overseeing image forming devices, with a more convenient avenue for communicating their individual thoughts and experiences regarding interaction with the image forming devices. The systems and methods according this disclosure may provide a mechanism to get closer to the actual users of the image forming devices for compiling more timely and accurate statistical data regarding issues deemed important enough to warrant Experience Feedback. This data can then be more effectively used to a number of beneficial purposes to include, for example, being folded into marketing and sales materials and future product specifications in a more accurate and timely manner.

Exemplary embodiments may employ automated recording of product functions or operations as an activity history over a predetermined time window. This automated recording may maintain, in a looping fashion, a record of most recent functions or operations for the product. As an example, 30 minutes of recorded information regarding actual functions or operations of the product, i.e., excluding periods of inactivity, may be captured in an ongoing manner with more recent data being added as older data is overwritten in a specific memory location. This data may then be extracted and forwarded in conjunction with the user generated "written" feedback in order to provide some machine operating context for the user-generated feedback. Product usage data pertinent to an active recent time frame helps to put into perspective the activity and status of the image forming device at the time the feedback is prompted, which could provide clues as to the nature of a problem, or other related parameters such as, for example, inefficient or incorrect product interactions, the particular media sizes in use, or the requested job types or sizes. A capacity to isolate product-specific issues from, for example, frustrations based on interaction with menu terms or sequences, or any number of other user-specific issues, may aid in clarifying the context of the comments provided by the user.

Exemplary embodiments may provide appropriate check boxes that may be manipulated by the user in order to augment or otherwise lead to an opportunity for a "written" statement when "FEEDBACK" (or another appropriate tag) is selected on a top level print driver page on the user's computer or workstation, or at a central computer.

Exemplary embodiments may automatically populate fields to provide product input and history by model, customer and specific unit, simplifying the process of providing feedback for the user while facilitating the collection and analysis of, for example, statistical insight into product needs that can be folded into field service plans, next generation iterations and future products in a way that user feedback or product usage data alone does not provide. Further, the disclosed systems and methods would accomplish all of this in a more timely fashion.

Exemplary embodiments may provide additional functionality in the feedback process, such as, for example, prompting sales or service calls that may be deemed appropriate to further explore the issues raised by the feedback, or otherwise to offer assistance or reminders about service, consumables, functionality, settings and the like.

Exemplary embodiments may provide for the transmission of user-generated feedback coupled with product-generated usage data in a convenient electronic form for automated compiling of content and statistics at a product monitoring center. A remote database, for example, at the product monitoring center could then be accessed for evaluation at appropriate intervals based on content changes, time or communication events. Data may also or alternatively be communicated to the product monitoring center by email or other messaging methods that may prompt real time reading and evaluation of the data by participating personnel, which may include automatic distribution to different recipients based on the content of the data including identification of a specific product, customer, issue or other like discriminator by which the incoming data may be automatically sorted.

Exemplary embodiments may provide, within an organization or networked environment, a mechanism whereby the opportunity for a specific user or group of users to be prompted to provide feedback according to the discussion above may be selectable. For security or other reasons, certain organizations may choose to limit or filter the feedback coming from individual end-users. As such, the systems and methods according to this disclosure may be limitedly enabled, or completely disabled, in a particular organization. Alternatively, user-generated feedback and associated product-generated data may be directed within the organization to a specific individual or group of individuals, rather than being initially directed in a default manner, for example, to a product monitoring center. In this manner, the specific individual or group of individuals may be afforded an opportunity to review the user-generated feedback and associated product-generated data to determine what feedback the organization may want to forward, for example, to the product monitoring center and in what form. The systems and methods according to this disclosure, therefore, may provide an organization, based on IT settings, an ability to enable, disable, limit or direct feedback collection. The driver offering and product data coupling may be set in this way for each specific product in order that different units, models, departments, locations and/or groups of users could be individually addressed.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed systems and methods for facilitating more consistent feedback from end-users of image forming devices supplemented by recent activity logs for the image forming devices on which the end-users provide the feedback, will be described, in detail, with reference to the following drawings, in which.

DETAILED DESCRIPTION OF THE DISCLOSED EMBODIMENTS

The systems and methods for facilitating more consistent feedback from end-users of image forming devices supplemented by recent activity logs for the image forming devices on which the end-users provide the feedback according to this disclosure will generally refer to this specific utility for those systems and methods. Exemplary embodiments described and depicted in this disclosure should not be interpreted as being specifically limited to any particular configuration, or directed to any particular intended use. In fact, any monitoring scheme related to collecting feedback on the operation of one or more widely deployed products that may benefit from the systems and methods according to this disclosure is contemplated.

Specific reference to, for example, any particular image forming device, including but not limited to any of a printer, copier, scanner, facsimile machine or multi-function device, should be understood as being exemplary only, and not limited, in any manner, to any particular class of devices. The systems and methods according to this disclosure will be described as being particularly adaptable to use in printing and/or copying devices such as, for example, image forming devices for printing and/or copying, but should not be considered as being limited to only these types of devices.

The systems and methods according to this disclosure may be particularly distinguished as including user-selectable Feedback options with subject selection checks boxes and provision for detailed written comment by the user with corresponding product usage/state information for a recent period of operation of the image forming device to be automatically coupled with the user-generated feedback. The Feedback can be automatically formatted to include a product name, model designation, site or location of the product, identity of the organization using/controlling the product and identification of the specific user, based on user name or login information by which the user gains access to the system in order to interact with the image forming device. The capacity to automatically format and send the user-generated comments, including any or all of the above and similar information, allows recipients of the feedback to appropriately sort the received information in a matter that may aid in enabling more timely product/line improvements, or more aggressive specific response to a particular customer or location needs and desires. At a recipient end, the identifying information enables automatic distribution according to any of the fields to appropriate recipients. Finally, a customer's ability to enable or disable, fully or selectively, the Feedback reporting/conveyance provides the customer with an appropriate mechanism to limit or filter the feedback as the customer may desire.

Figure 1:
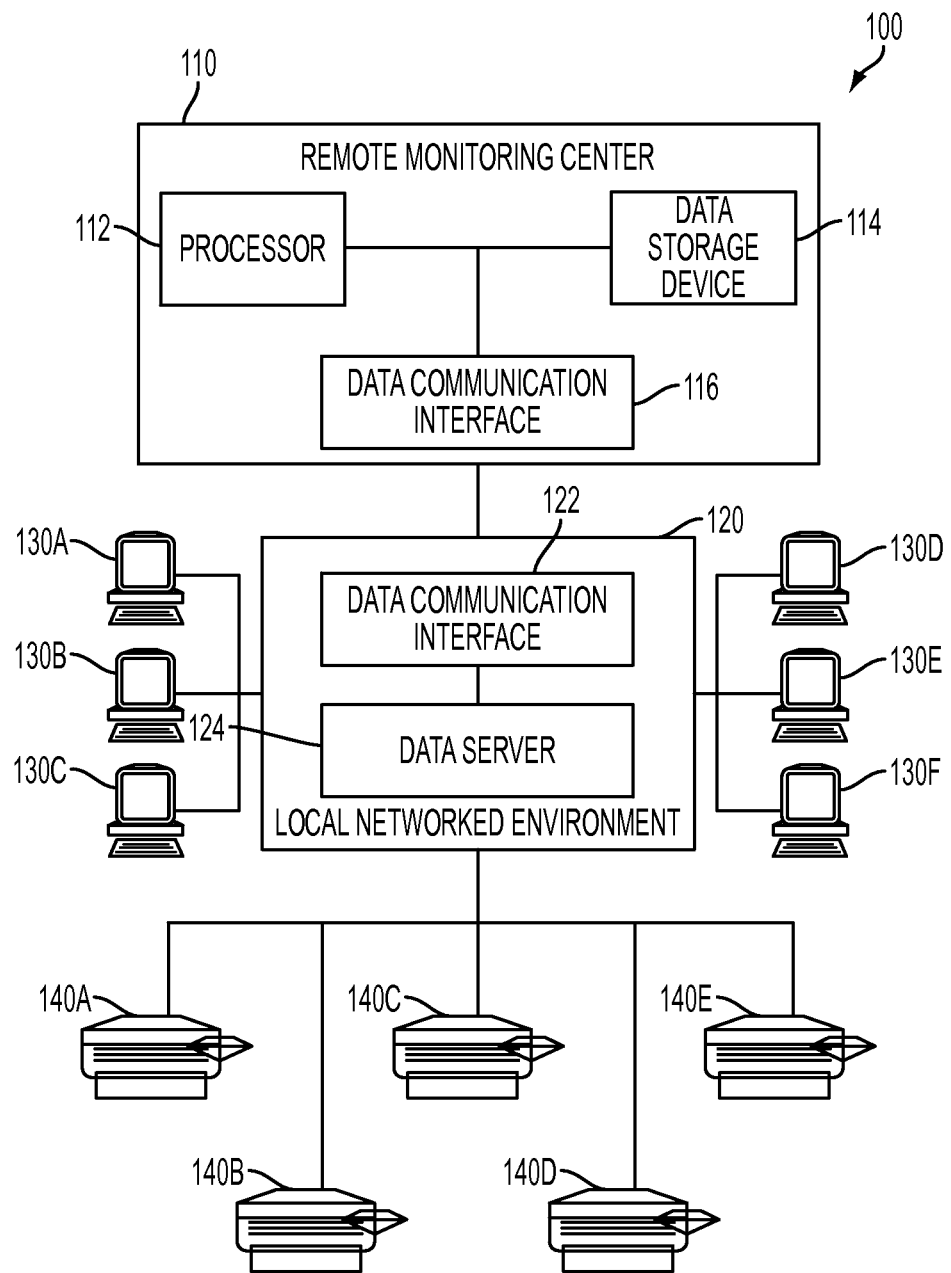
FIG. 1 illustrates a schematic diagram of an exemplary overview of networked environment including a plurality of user workstations and a plurality of image forming devices within which the systems and methods according to this disclosure may operate.

The Feedback opportunity and benefit extends from a single customer unit to any number of units all the way to departmental or company-wide installations with many imaging products. FIG. 1 illustrates a schematic diagram of an exemplary overview of a networked computing environment 100 including a plurality of user workstations 130A-F and a plurality of image forming devices 140A-E interacting via a local networked environment 120 within which the systems and methods according to this disclosure may operate. As shown in FIG. 1, the exemplary networked computing environment 100 may include at least one remote monitoring center 110 that may be in wired or wireless communication with an organization's local networked environment 120.

The local networked environment 120 shown in FIG. 1 is simplified to include, as peripheral devices, only a plurality of user workstations 130A-F and a plurality of image forming devices 140A-E with which the plurality of user workstations 130A-F may interact, through wired or wireless communication, via the local networked environment 120. One of skill in the art will recognize that many other systems and system components, for example, high capacity media supply devices and sorters or other output finishers, as well as non-printing products such as paper folders or envelope insertion devices, may be included in the local networked environment 120. The inclusion of other systems and system components within the local networked environment 120 may be according to known methods and will not be further described in this disclosure.

The remote monitoring center 110 may be advantageously located at, for example, an appropriate site for a product manufacturer or supplier to use to monitor all manner of inputs regarding fielded products that are disposed in widely diverse locations. The remote monitoring center 110 may include at least one data communication interface 116 for external data communication with at least one cooperating data communication interface 122 in a local networked environment 120 operated by an organization that uses the fielded products. The at least one data communication interface 116 may enable the remote monitoring center 110 to communicate directly with at least some of the widely diverse locations in which the fielded products are located. Depending on a customer's desires, the remote monitoring center 110 may communicate directly with the local networked environment 120 in the company's location, or otherwise may be enabled to communicate directly with the one or more products such as the plurality of image forming devices 140A-E in communication with the local networked environment 120.

The remote monitoring center 110 may include at least one local processor 112 and at least one local data storage device 114 in order that information, such as feedback information regarding the operation of one or more of the fielded products may be properly sorted, analyzed, or otherwise stored in an appropriate database in, for example, the at least one local data storage device 114.

The local networked environment 120 may include the data communication interface discussed above to facilitate all manner of external data communication with the local networked environment 120, and individual components connected to the local network environment 120, as will be described in more detail below. The local network environment 120 may also include at least one data server 124. The at least one data server 124 may at once incorporate its own data processor and/or data storage device in communication with the data processor. Otherwise, the at least one data server 124 may include only one or more data storage devices serving simply as a data repository and conduit for information flow between the plurality of user workstations 130A-F and the plurality of image forming devices 140A-E with which the plurality of user workstations 130A-F may interact through the local networked environment 120. In other words, provision for processing, transmission/reception and storage of data in the local networked environment 120 may be by individual processors and data storage devices in any of the local networked environment 120, the plurality of user workstations 130A-F and the plurality of image forming devices 140A-E, or in various combinations thereof.

The plurality of user workstations 130A-F may communicate with the plurality of image forming devices 140A-E for directing or enabling operation of the plurality of image forming devices 140A-E. This communication may be via wired or wireless means through the local networked environment 120. The plurality of user workstations 130A-F may send, for example, print jobs to one or more of the plurality of image forming devices 140A-E. The plurality of user workstations 130A-F may also receive feedback from the one or more of the plurality of image forming devices 140A-E regarding conditions of the one or more of the plurality of image forming devices 140A-E that, for example, may affect the ability of an individual image forming device of the plurality of image forming devices 140A-E to execute a commanded print job.

Figure 2:
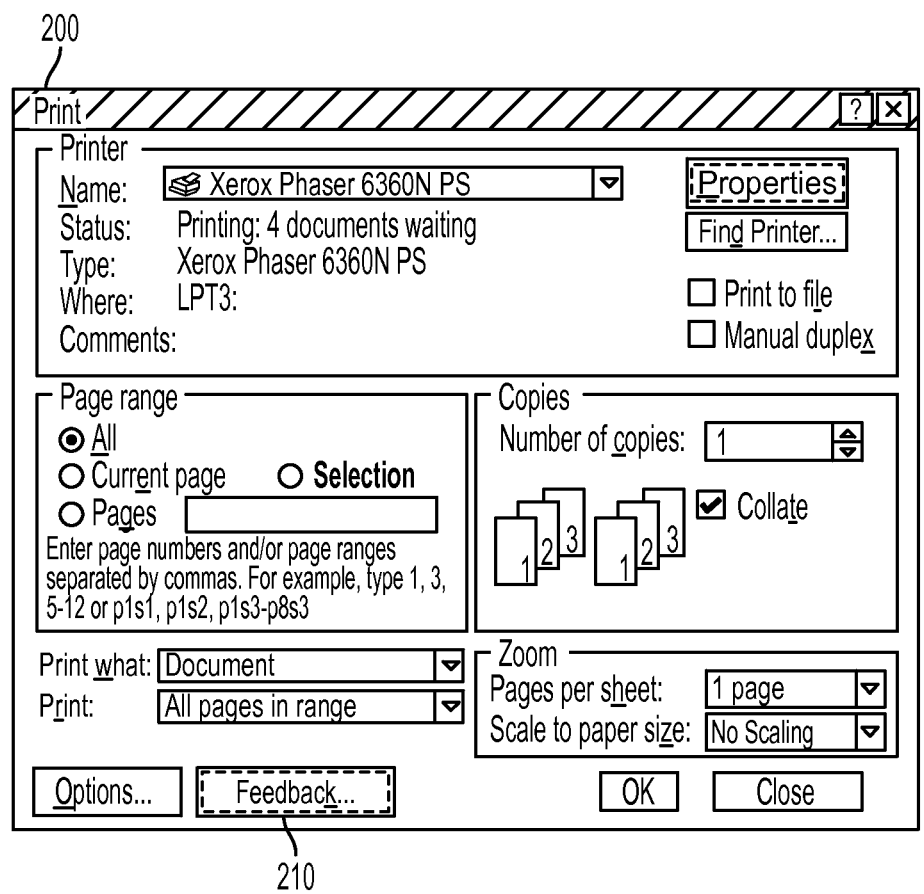
FIG. 2 illustrates an exemplary embodiment of a top level print driver page that may be displayed on user's computer or workstation for implementing the systems and methods according to this disclosure.

FIG. 2 illustrates an exemplary embodiment of a top level print driver page 200 that may be displayed on user's computer or workstation for implementing the systems and methods according to this disclosure. As is shown in FIG. 2, the top level print driver page 200 may include significant detail regarding interaction with one or more image forming (printer) devices with which the user's computer or workstation displaying the top level print driver page 200 may be in communication. In order to carry into effect the feedback scheme according to this disclosure, an additional "Feedback" field or activation button 210 may be added to the top level print driver page 200. For consistency, all print drivers may include the additional "Feedback" field or activation button 210 on the top level print driver page 200. In order, however, for the customer or customer organization to be able to exercise control over the feedback that its employees or other end-users may provide, the print driver may include an option in which system administrator personnel may be able to disable this "Feedback" option. In such instances, the "Feedback" field or activation button 210 may continue to be displayed, but it may be displayed in a manner that indicates that it is not available for selection or actuation by the user. The displayed Feedback activation may be an active or passive actionable selection by being a standard displayed "button" or by having a more overt presentation of a Feedback selection prompted by a fault, maintenance requirement or other non-routine occurrence associated with the user's print job.

While significant detail is provided in FIG. 2, it should be recognized that detail shown is merely for clarity and ease of understanding. No particular configuration to, for example, the top level print driver page 200 shown in FIG. 2 is to be implied by the detailed depiction provided. Also, no particular positioning, size or shape of the additional "Feedback" field or activation button 210 on the top-level print driver page 200 is implied. Virtually any top-level print driver page that may be modified to include an additional "Feedback" field or activation button, in any configuration, and in any position on the top-level print driver page is contemplated.

Figure 3:
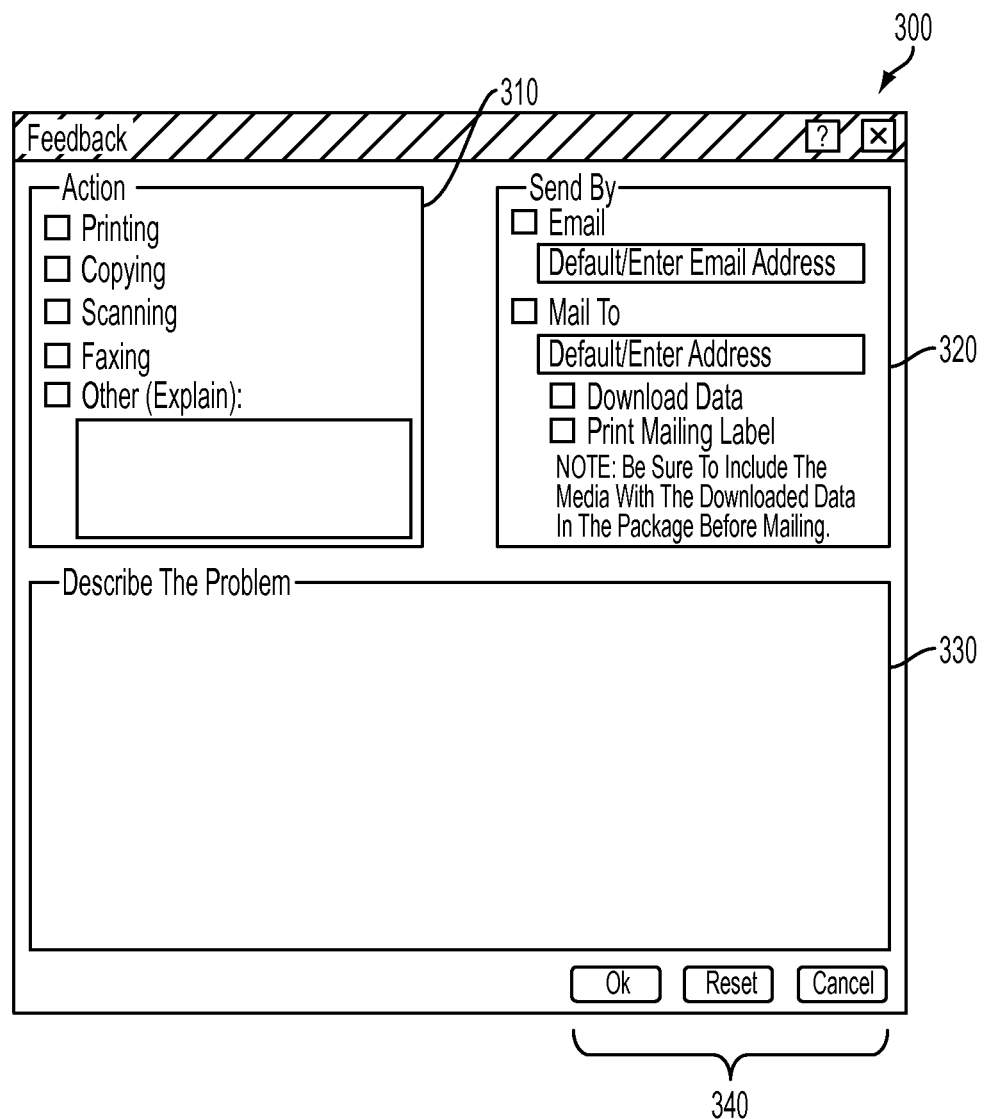
FIG. 3 illustrates an exemplary embodiment of a "Feedback" print driver page associated with the top level print driver page shown in FIG. 2 that may be displayed on user's computer or workstation for facilitating the feedback scheme according to this disclosure.

Actuation of the additional "Feedback" field or activation button 210 on the top-level print driver page 200 shown in FIG. 2 by a user on whose workstation the top-level print driver page 200 is displayed, according to known methods, may cause one or more actions to occur simultaneously. These actions may include the following. First, the page displayed on the user's workstation may change to show a "Feedback" print driver page as will be described in more detail below. Second, fields in an electronic data form may be automatically populated to include identifying information for the feedback including the identity of the product, the identity of the customer controlling the product, and the identity of the user initiating the feedback, as well as a timestamp for the actuation of the feedback button. Third, a data entry may be recorded in a specific data storage location in the image forming device in order that product-recorded data for a predetermined period prior to the user initiating the feedback may be identified and captured. This data entry may be intelligently placed at a point in the product-recorded data, or may intelligently refer to a point in the product-recorded data at which the user is indicated as most recently having interacted with the image forming device one or more times as it is the product-recorded data related to this interaction that most reasonably is anticipated to provide the context for the user generating the feedback. Data saved over a time period can instead be data associated with "N" number of operations and/or user interactions. Either of the number or time period can be a product default, further with a default time or number for the overwrite loop. Specific customer selections and settings may be made to alter the defaults. In another implementation, data that may be used in the Feedback process may be a portion of a greater body of product usage data that is more extensively or continuously captured and where the Feedback portion is extracted in accordance with the selected parameters associated with the Feedback process. Capturing or enabling access to data relating to a time period or "N" number of operations is in both cases considered a data timeframe FIG. 3 illustrates an exemplary embodiment of a "Feedback" print driver page 300 associated with the top level print driver page 200 shown in FIG. 2 that may be displayed on user's computer or workstation for facilitating the feedback scheme according to this disclosure. As shown in FIG. 3, a user who has chosen to provide feedback regarding operation of the particular image forming device with which he or she attempted to interact may be provided with a guided form for providing such feedback. Individual fields may be provided to facilitate the user's completion of the feedback form. It is anticipated that the information provided on this user-generated form may be used to populate additional fields in an electronic form generated by a system to record the feedback.

An "Action" field 310 may be provided, including a series of checkboxes, in order that the user may be able to specify what action the user was attempting to undertake with the image forming device at the time that the circumstances arose that prompted the user to provide the feedback. Examples of such checkboxes may include, for example, "Printing," "Copying," "Scanning," "Faxing," or an "Other" checkbox with an opportunity for the user, in a freeform text box, to Explain what precise action proper the feedback.

A "Send By" field 320 may be included in order to provide a series of checkboxes so that the user may be able to select a manner by which the data is to be transmitted. It is anticipated that an electronic data form including the user's provided information will be coupled with an electronic file including the recorded product produced and stored data now potentially time stamped to record the initiation of the feedback event. In such an instance, the default setting in the "Send By" field may be to check the "Email" box. Depending on a user organization's preferred settings, a default email address may be provided in this field as well. The default email address may be provided to direct the feedback information to a remote monitoring center, or otherwise may be provided to direct user-generated feedback information to a single individual or group of individuals within the organization for review and comment, or other filtering, before the organization dispatches the feedback information to the resource monitoring center. Again depending on a particular user organization's desires, the user may be afforded an opportunity to prepare a post package to forward the feedback to an appropriate collection point. In such an instance, the user may be afforded the opportunity to select the "Mail To" option that may then cause the image forming device to print the feedback form in hard copy. In such an instance, the user may be prompted to download the product produced and stored data to an appropriate portable data recording medium, and otherwise may be reminded to include that medium in the post package in the manner shown in exemplary form in FIG. 3.

Product produced and stored data may not be an aspect of intended Feedback, for example, a suggested feature or other desired improvement that may have nothing to do with recent experience or product interaction. In this case, the Feedback form 300 may have an additional check box (not shown) that would eliminate including product operation data from the communication. In another situation, providing captured product parameter data with the Feedback may be objectionable for security or other reasons so this aspect of Feedback can be deselected or turned off by the customer. Product produced and stored data may be beneficial but a necessity to include the data in the Feedback process may inhibit user Feedback so, in an implementation, the process of including data may be enabled, disabled or enabled with restrictions as to content.

A freeform text field 330 may be provided which prompts the user to describe the particular problem or difficulty that prompted the user to initiate feedback process. As with other common forms, a series of final action buttons 340 may be provided to afford the user an opportunity to send the feedback, reset the form, save the communication for later Feedback combination or submission or otherwise to cancel the feedback action altogether.

As was discussed above with regard to the significant detail provided in FIG. 2, it should be recognized that the detail shown in FIG. 3 is merely for clarity and ease of understanding. No particular configuration, for example, for the "Feedback" print driver page 300 shown in FIG. 3 is to be implied by the detailed depiction provided. Also, no particular positioning, size or shape of the depicted fields, checkboxes, or labels on the "Feedback" print driver page 300 is implied. Virtually any "Feedback" print driver page that may be modified by the product provider and may ultimately solicit the feedback to its use in any configuration, and with individual elements in any position on the "Feedback" print driver page, is contemplated.

Figure 4:
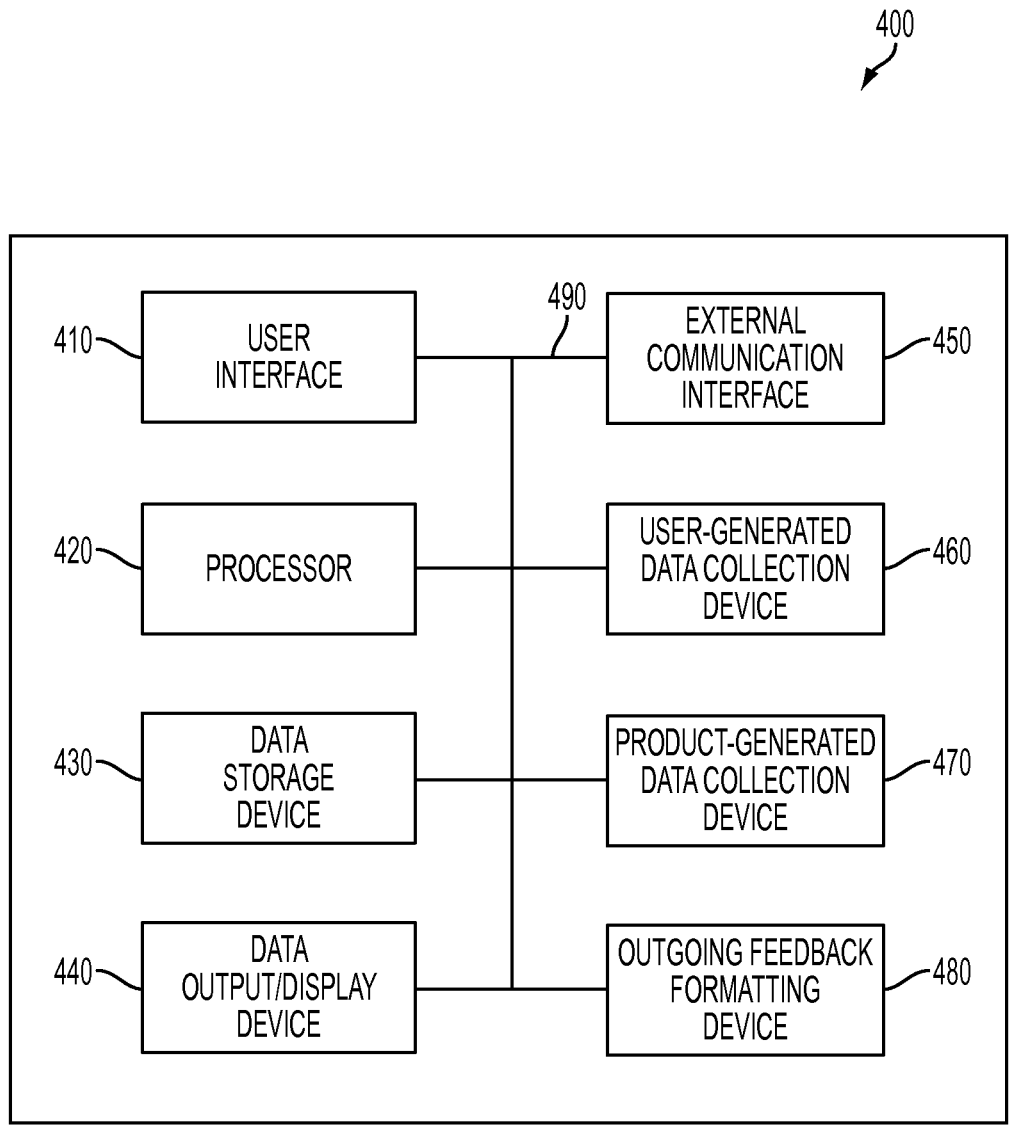
FIG. 4 illustrates a block diagram of an exemplary system to be associated with at least one image forming device for providing combined user-generated information and product-generated data as feedback regarding operation of the at least one image forming device according to this disclosure.

FIG. 4 illustrates a block diagram of an exemplary system 400 to be associated with at least one image forming device for providing combined user-generated information and product-generated data as feedback regarding operation of the at least one image forming device according to this disclosure. Portions of the exemplary system 400 shown in FIG. 4 may be housed in, or attached to, a particular image forming device, may be resident in a user's workstation, and/or may be provided in, for example, a central mainframe of a local networked environment. In other words, individual devices and units, or functions accomplished by those devices and units, may be most appropriately located in any of the individual elements comprising the local networked environment including the peripheral workstations and image forming devices. Each of the individually-depicted devices and units may be in wired and/or wireless communication with each of the other depicted devices and units.

The exemplary system 400 may include a user interface 410 by which the user may communicate with the exemplary system 400. The user interface 410 may be configured as one or more conventional mechanisms common to computing devices such as, for example, the user's workstation, that permit the user to input information to the exemplary system 400. The user interface 410 may include, for example, a conventional keyboard and mouse, a touchscreen with "soft" buttons or with various components for use with a compatible stylus, a microphone by which a user may provide oral commands to the exemplary system 400 to be "translated" by a voice recognition program, or other like device by which a user may communicate specific operating instructions via the user's workstation to the exemplary system 400. The user interface may otherwise, or separately, include a portion, or a function, of a graphical user interface (GUI) in one or more of the image forming devices with which the exemplary system 400 is associated.

The user interface 410 may be employed by the user to manipulate different print driver pages that may be displayed on a data output/display device 440 associated with the exemplary system 400. As with the user interface 410, the data output/display device 440 may be associated with either of the user's workstation or the one or more image forming devices as will be discussed in greater detail below. As indicated above, however, an objective of the feedback schemes according to disclosure is to facilitate the user's interaction with the feedback systems and methods. As such, it is preferable that the user interface 410 and the data output/display device 440 be those most commonly associated with the user's workstation.

The exemplary system 400 may include one or more local processors 420 for individually operating the exemplary system 400 and carrying out the interaction between the portions of the exemplary system 400 resident in the user's workstation, those portions of the exemplary system 400 that may be hosted on, for example, a mainframe of the local networked environment, or those portions of the exemplary system 400 that may be resident in one or more image forming devices with which the user's workstation communicates via the local networked environment. Processor(s) 420 may include at least one conventional processor or microprocessor that may be provided to interpret and execute instructions for communication and interaction between a user's workstation and one or more image forming devices via the local networked environment. Processor(s) 420 may be provided to present to the user, via one or more data output/display devices 440, an interactive display for directing functioning of the one or more image forming devices. Processor(s) 420 may be provided to display, in a user-friendly manner, an opportunity for the user to generate feedback on operation of the one or more image forming devices. Processor(s) 420 may be provided to direct collection of operating parameter data by at least one of the one or more image forming devices, and further to direct storage of the collected operating parameter data in at least one specific data storage device 430 that may be provided in the at least one of the one or more image forming devices, in a mainframe associated with the local networked environment, or in one or more user's workstations. Processor(s) 420 may be provided to interpret a user's responses to feedback queries, and/or a user's freeform inputs, made during a user-generated feedback process, and to format outgoing user-generated feedback in a predetermined manner that may be easy to sort, distribute and/or otherwise interpret and analyze by a receiving entity. Processor(s) 420 may be provided to automatically append to the user-generated feedback form an electronic file containing a predetermined amount of the stored operating parameter data collected by the one of the one or more image forming devices that is the subject of the user-generated feedback in order to provide an operating context for the one of the one or more image forming devices that may have prompted the user to generate feedback. Processor(s) 420 may further be provided to carry into effect other actions as may be implicit in supporting the feedback scheme according to this disclosure.

The exemplary system 400 may include one or more data storage devices 430, which may be located in any one or more of the specific locations discussed above. Such data storage device(s) 430 may be used to store the product-generated operating parameter data, other relevant data, and/or such operating programs that may be used by the exemplary system 400, and specifically the processor(s) 420 to carry into effect the feedback schemes according to this disclosure. At least one data storage device 430 may be designated for each of the one or more image forming devices to act as a specific repository for a certain amount of looping, over writable data regarding operating parameters of each of the one or more image forming devices.

Data storage device(s) 430 may include a random access memory (RAM) or another type of dynamic storage device that is capable of storing collected information, and separately of storing instructions for execution of system operations by, for example, processor(s) 420. Data storage device(s) 430 may also include a read-only memory (ROM), which may include a conventional ROM device or another type of static storage device that stores static information and instructions for processor(s) 420.

The exemplary system 400 may include one or more external data communication interfaces 450. The external data communication interface(s) 450 may be provided to facilitate communication between one or more user workstations and one or more image forming devices. Additionally, the external data communication interfaces 450 may be provided to facilitate communication from the one or more user workstations or the one or more image forming devices to a remote monitoring center for collection and further processing of user-generated feedback combined with product-generated operating parameter data. The external data communication interface(s) 450 may include any configuration that facilitates wired or wireless communication, or a combination thereof, between the individual nodes shown, for example, in FIG. 1. In other words, the external data communication interface(s) 450 may be configured to include any mechanism that facilitates communication via a local networked environment with peripheral devices of the local networked environment, or external communication with other nodes in support of the disclosed feedback schemes.

The exemplary system 400 may include a user-generated data collection device 460 that may specifically generate an opportunity for a user, at a user workstation, for example, to commence a feedback process. The user-generated data collection device 460 may operate in conjunction with the processor(s) 420 to display, for example, on a data output/display device 440, a user-friendly form by which a user may be prompted to provide feedback comments regarding interaction with one or more image forming devices. The user-generated data collection device 460 may populate individual fields in an electronic data form to include specific identifying data regarding the one or more image forming devices on which the feedback is being generated. This data may include identifying (1) the one or more image forming devices, (2) the customer having control over the one or more image forming devices, (3) a location of the one or more image forming devices, (4) the user generating the feedback, and/or (5) other information that the exemplary system 400 may be able to discern regarding the feedback event. The user-generated data collection device 460 may further interpret responses by the user in order to add information generated by the user to appropriate fields in the electronic data form. The user-generated data collection device 460 on its own, or in combination with the processor(s) 420, may include a capability by which an individual customer, or customer organization, may disable an ability of the user to generate feedback according to the disclosed feedback scheme.

The exemplary system 400 may include a product-generated data collection device 470 that may specifically generate and store information regarding operating parameters of each of one or more image forming devices. The product-generated data collection device 470 may retrieve a predetermined or specified amount of the stored information pursuant to a user commencing a feedback process regarding interaction with a specific one of the one or more image forming devices. The product-generated data collection device 470 may operate in conjunction with the processor(s) 420 to provide appropriate context data regarding the operating parameters of the specific one of the image forming devices that prompted the user to commence the feedback process. The product-generated data collection device 470 may provide the recovered stored data to the exemplary system 400 in a form that the recovered stored data can be easily appended to the electronic data form including the user-generated feedback for transmission, for example, to a remote monitoring center.

The exemplary system 400 may include an output feedback formatting device 480. The output feedback formatting device 480 may be used to collect and combine the electronic data generated by both the user-generated data collection device 460 and the product-generated data collection device 470 in an appropriate format to be output from the exemplary system 400 via, for example, the external data communication interface 450. The output feedback formatting device 480 may appropriately address the outgoing data package for transmission by a user-selected means, preferably electronically, to an appropriate recipient. According to a customer's, or customer organization's, desires, the address to which the outgoing feedback data is addressed may be a remote monitoring center associated with the manufacturer or supplier of the one or more image forming devices, or may otherwise be an address internal to the organization in order that an individual or group of individuals within the organization may screen, collect, filter, or otherwise pre-process the combined user-generated/product-generated feedback data prior to further transmission.

All of the various components of the exemplary system 400, as depicted in FIG. 4, may be connected by one or more data/control busses 490. These data/control busses 490 may provide wired or wireless communication between the various components of the exemplary system 400 regardless of which specific component or node of the local networked environment within which each of the individual devices or units depicted in FIG. 4 may be housed.

It should be appreciated that, although depicted in FIG. 4 as what appears to be an integral unit, as is outlined in detail above, the various disclosed elements of the exemplary system 400 may be arranged in any combination of sub-systems as individual components or combinations of components, integral to a single unit, or as components of a local networked environment, and particularly one or more image forming devices, with which the exemplary system 400 is associated. Alternatively, a single processor with integrated data storage function may be utilized to perform the described functions. Therefore, no specific configuration is to be implied by the depiction in FIG. 4.

Figure 5:
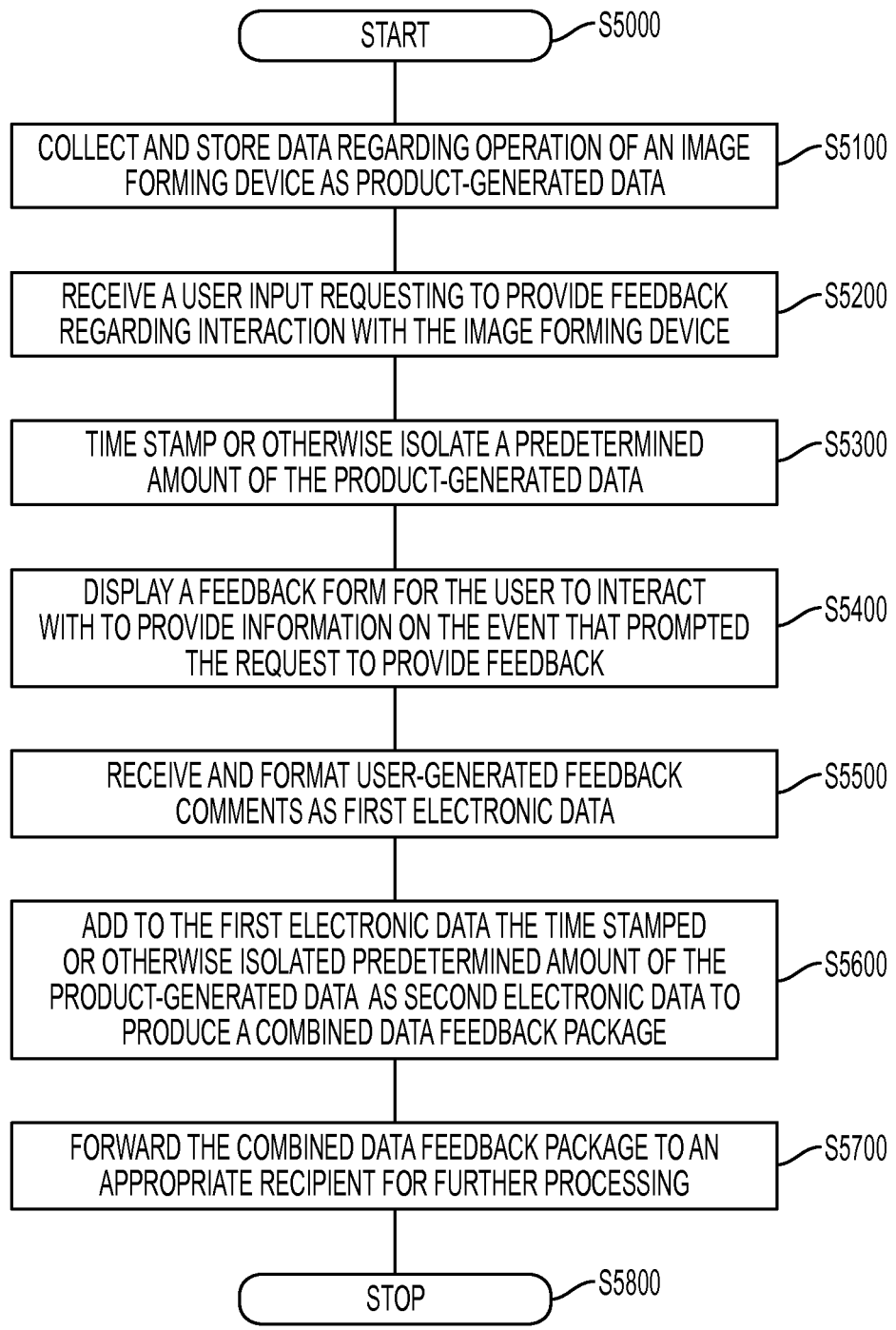
FIG. 5 illustrates a flowchart of an exemplary method for providing combined user-generated information and product-generated data as feedback regarding operation of a product according to this disclosure.

The disclosed embodiments may include a method for facilitating more consistent feedback from end-users of image forming devices supplemented by recent activity logs for the image forming devices on which the end-users provide the feedback. FIG. 5 illustrates a flowchart of such an exemplary method. As shown in FIG. 5, operation of the method commences at Step S5000 and proceeds to Step S5100.

In Step S5100, one or more image forming devices may collect and store information regarding operation of the one or more image forming devices. Information may include, for example, product usage, faults, interventions and maintenance associated with a particular "current" time window. Operation of the method proceeds to Step S5200.

In Step S5200, a user input requesting to provide feedback regarding interaction with one or more image forming devices may be received. The method may provide some simplified manner by which the user may initiate the request to provide feedback. Such a simplified method may include providing, for example, on a top-level print driver page, a Feedback field or activation button to be easily manipulated by a user via, for example, a user interface associated with a user's workstation that displays, on a display device, the top-level print driver page. The receiving of the user input requesting to provide feedback may initiate the several steps in the feedback process set forth below. Operation of the method proceeds to Step S5300.

In Step S5300, action may be taken to isolate a portion of the stored information regarding operation of the one or more image forming devices that prompted the user's request to provide feedback regarding the interaction with the device. This isolation may be based on an intelligent identification of the user's interaction with the particular one or more image forming devices. Operation of the method proceeds to Step S5400.

In Step S5400, a feedback form for the user to employ to provide the requested feedback may be displayed, for example, on a display device associated with the user's workstation. This feedback form may be presented as a combination of checkboxes and free-form data fields that the user can easily navigate to provide appropriate information regarding the circumstances that prompted the user to request to provide the feedback. Operation of the method proceeds to Step S5500.

In Step S5500, user inputs are received and properly formatted as a first part of an electronic feedback package that may be generated according to the user's request. Operation of the method proceeds to Step S5600.

In Step S5600, the portion of the stored information regarding operation of the one or more image forming devices that prompted the user's request to provide feedback regarding the interaction with the device, which was previously isolated, may be appropriately packaged as a second part of the electronic feedback package that may be generated according to the user's request. Combining the product-generated data with the user-generated data provides an appropriate context for analysis of the particular issue that prompted the user's request to provide feedback. Operation of the method proceeds to Step S5700.

In Step S5700, the combined data package including the user-generated data and the product-generated data may be specifically addressed and forwarded to a recipient of the user's choosing. Depending on the desires of the customer, or the customer organization, that controls the one or more image forming devices that are the subject of the user feedback, the combined data package may be forwarded directly to a remote monitoring center associated with a supplier or manufacturer of the one or more image forming devices. Otherwise, the combined data package may be forwarded to an individual or group of individuals internal to the organization for further review, or other actions including, for example, screening, collecting, filtering, or pre-processing of the combined data package, and a determination whether the combined data package should be forwarded from the organization, for example, to the remote monitoring center. Operation the method proceeds to Step S5800, where operation of the method ceases.

The disclosed embodiments may include a non-transitory computer-readable medium storing instructions which, when executed by a processor, may cause the processor to execute all, or at least some, of the steps of the method outlined above.

The above-described exemplary systems and methods reference certain conventional components to provide a brief, general description of suitable communication and processing environments in which the subject matter of this disclosure may be implemented for familiarity and ease of understanding. Although not required, elements of the disclosed exemplary embodiments may be provided, at least in part, in a form of hardware circuits, firmware, or software computer-executable instructions to carry out the specific functions described. These may include individual program modules executed by one or more processors. Generally, program modules include routine programs, objects, components, data structures, and the like that perform particular tasks, or implement particular data types, in support of the overall objective of the systems and methods according to this disclosure.

Those skilled in the art will appreciate that other embodiments of the disclosed subject matter may be practiced in a local networked environment with many types of communication equipment and computer system configurations. Embodiments according to this disclosure may be practiced in distributed computing environments where tasks are performed by local and remote processing devices that may be linked to each other by hardwired links, wireless links, or a combination of both, through a communication network. In a distributed computing environment, program modules may be located in both local and remote data storage devices.

As indicated above, embodiments within the scope of this disclosure may also include computer-readable media having stored computer-executable instructions or data structures that can be accessed, read and executed by one or more processors. Such computer-readable media can be any available media that can be accessed by a processor, general purpose or special purpose computer. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. When information is transferred or provided over a network or via another communications connection, whether wired, wireless, or in some combination of the two, the receiving processor properly views the connection as a computer-readable medium. Thus, any such connection is properly termed a computer-readable medium. Combinations of the above should also be included within the scope of the computer-readable media for the purposes of this disclosure.

Computer-executable instructions include, for example, non-transitory instructions and data that can be executed and accessed respectively to cause a processor to perform certain of the above-specified functions, individually or in various combinations. Computer-executable instructions may also include program modules that are remotely stored for access and execution by a processor.

The exemplary depicted sequence of executable instructions or associated data structures represents one example of a corresponding sequence of acts for implementing the functions described in the steps. The exemplary depicted steps may be executed in any reasonable order to effect the objectives of the disclosed embodiments. No particular order to the disclosed steps of the method is necessarily implied by the depiction in FIG. 5, and the accompanying description, except where a particular method step is a necessary precondition to execution of any other method step.

Although the above description may contain specific details, they should not be construed as limiting the claims in any way. Other configurations of the described embodiments of the disclosed systems and methods are part of the scope of this disclosure. For example, the principles of the disclosure may be applied to each individual image forming device of a plurality of image forming devices, widely deployed and connected to any number of communications interfaces with which, for example, a remote monitoring center may communicate. In such instances, each image forming device may include some portion of the disclosed system and execute some portion of the disclosed method.

It will be appreciated that various of the above-disclosed and other features and functions, or alternatives thereof, may be desirably combined into many other different systems or applications. Also, various alternatives, modifications, variations or improvements therein may be subsequently made by those skilled in the art which are also intended to be encompassed by the following claims.

I claim:

1. A method for providing feedback regarding an image forming device, comprising:
   displaying, on a display device, a prompt for users to submit feedback on a top level print driver page associated with an image forming device;
   receiving, by a processor, an electronic request from a particular user to provide feedback regarding interaction between the particular user and the image forming device by actuating the prompt on the top level print driver page;
   changing, with the processor, the display on the display device to a formatted feedback form upon the particular user's actuation of the prompt by manipulating a user interface associated with the display device;
   receiving, with the processor, feedback information provided by the particular user via the particular user's manipulation of the user interface;
   producing, with the processor, a combined feedback package by combining the received feedback information provided by the particular user with product-generated operating parameter data relevant to a timeframe in which the particular user interacted with the image forming device prior to generating the electronic request to provide feedback; and
   outputting the combined data feedback package to a reviewing entity for action.

2. The method of claim 1, the image forming device recording operating parameter data and storing the operating parameter data in a specific data storage location in the image forming device.

3. The method of claim 2, the recorded and stored operating parameter data covering a specific time interval for operation of the image forming device.

4. The method of claim 3, the specific time interval being a fixed time interval after which earliest recorded information is overwritten to maintain the fixed time interval of data in the specific data storage location.

5. The method of claim 4, the product-generated operating parameter data being all or a portion of the recorded and stored operating parameter data relevant to the timeframe in which the particular user interacted with the image forming device.

6. The method of claim 2, the recorded and stored operating parameter data including indications of which users interacted with the image forming device and a nature of each of the users' interaction.

7. The method of claim 6, further comprising determining the timeframe in which the particular user interacted with the image forming device prior to generating the electronic request to provide feedback by reviewing the indications of which users interacted with the image forming device and the nature of each of the users' interaction.

8. The method of claim 7, the determining of the timeframe being based, at least in part, on the feedback information provided by the particular user.

9. The method of claim 1, further comprising limiting the outputting to the reviewing entity by electronically limiting available recipients for the combined feedback package in a manner that is not accessible by the particular user.

10. A system for providing feedback regarding an image forming device, comprising:

a display device that (1) displays an actionable selection for users to submit feedback on a top level print driver page associated with an image forming device; device the actionable selection including a feedback prompt, and (2) changes the display to a formatted feedback form upon a particular user's actuation of the prompt by manipulating a user interface associated with the display device; and a feedback processor that is programmed (a) to receive feedback information provided by the particular user via the user interface on the formatted feedback form to which the display is changed only after actuation of the prompt by the particular user, and (b) to produce a combined feedback package by combining the feedback information provided by the particular user with product-generated operating parameter data relevant to a timeframe in which the particular user interacted with the image forming device prior to providing the feedback, as enabled; and an external communication interface that outputs the combined data feedback package to a reviewing entity for action.

11. The system of claim 10, further comprising an image forming device processor that is programmed to record operating parameter data for the image forming device and to store the operating parameter data in a specific data storage location in the image forming device, the recorded and stored operating parameter data covering a specific fixed time interval for operation of the image forming device, the processor directing that earliest recorded information be overwritten to maintain the fixed time interval of data in the specific data storage location.

12. The system of claim 11, the recorded and stored operating parameter data including indications of which users interacted with the image forming device and a nature of each of the users' interaction, and the feedback processor being further programmed to determine the timeframe in which the particular user interacted with the image forming device prior to providing the feedback by reviewing the indications of which users interacted with the image forming device and the nature of each of the users' interaction to identify user interaction by the particular user.

13. The system of claim 12, the feedback processor being further programmed to determine the timeframe in which the particular user interacted with the image forming device prior to providing the feedback based on the feedback information provided by the particular user.

14. The system of claim 10, the feedback processor being further programmed to limit the reviewing entity to which the combined data feedback package is output.

15. The system of claim 10, the feedback processor being further programmed to be disabled to limit all feedback outputs from the system.

16. The system of claim 10, the image forming device being at least one of a printing device, a copying device or media handling device.

17. The system of claim 10, the operating parameter data accompanying user feedback information being extracted from a larger database based on the applicable user interaction timeframe prior to the user providing feedback.

18. A non-transitory computer-readable medium storing instructions which, when executed by a processor, cause the processor to execute the steps of a method for providing feedback regarding an image forming device comprising:

displaying, on a display device, a prompt for users to submit feedback on a top level print driver page associated with an image forming device;

receiving an electronic request from a particular user to provide feedback regarding interaction between the particular user and the image forming device by actuating the prompt on the top level print driver page;

changing the display on the display device to a formatted feedback form upon the particular user's actuation of the prompt by manipulating a user interface associated with the display device;

receiving feedback information provided by the particular user via the particular user's manipulation of the user interface;

producing a combined feedback package by combining the received feedback information provided by the particular user with product-generated operating parameter data relevant to a timeframe in which the particular user interacted with the image forming device prior to generating the electronic request to provide feedback, as enabled; and outputting the combined data feedback package to a reviewing entity for action.

\* \* \* \* \*